United States Patent
Levisse et al.

(10) Patent No.: US 12,031,448 B2
(45) Date of Patent: Jul. 9, 2024

(54) DEVICE FOR CENTERING AND GUIDING A SHAFT OF AN AIRCRAFT TURBINE ENGINE

(71) Applicant: SAFRAN AIRCRAFT ENGINES, Paris (FR)

(72) Inventors: Paul Ghislain Albert Levisse, Moissy-Cramayel (FR); Emmanuel Fabrice Marie Baret, Moissy-Cramayel (FR); Julien Fabien Patrick Becoulet, Moissy-Cramayel (FR); Alexandre Jean-Marie Tan-Kim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/549,794

(22) PCT Filed: Mar. 8, 2022

(86) PCT No.: PCT/FR2022/050411
§ 371 (c)(1),
(2) Date: Sep. 8, 2023

(87) PCT Pub. No.: WO2022/195194
PCT Pub. Date: Sep. 22, 2022

(65) Prior Publication Data
US 2024/0151159 A1      May 9, 2024

(30) Foreign Application Priority Data

Mar. 18, 2021   (FR) ...................................... 2102710

(51) Int. Cl.
*F01D 25/16*          (2006.01)

(52) U.S. Cl.
CPC ...... *F01D 25/162* (2013.01); *F05D 2220/323* (2013.01)

(58) Field of Classification Search
CPC ..................... F01D 25/162; F05D 2220/323
See application file for complete search history.

(56) References Cited

U.S. PATENT DOCUMENTS

| 3,357,757 A | 12/1967 | Willia et al. |
| 4,453,783 A | 6/1984 | Davis et al. |

(Continued)

FOREIGN PATENT DOCUMENTS

| CN | 103244276 A | 8/2013 |
| FR | 2519101 A1 | 7/1983 |

(Continued)

OTHER PUBLICATIONS

International Search Report received for PCT Patent Application No. PCT/FR2022/050411, mailed on Apr. 28, 2022, 7 pages (2 pages of English Translation and 5 pages of Original Document).

*Primary Examiner* — Jesse S Bogue
(74) *Attorney, Agent, or Firm* — WOMBLE BOND DICKINSON (US) LLP

(57) ABSTRACT

A device for centering and guiding a shaft of an aircraft turbine engines. The device includes an outer ring of a rolling bearing, the ring extending about a main axis and having orifices arranged around the axis axis; an annular bearing support extending about the main axis and at least partially about the ring, the support having orifices and openings arranged about the axis; and a series of studs for linking the ring to the support, the studs being distributed about the main axis and having elongation axes substantially parallel to the main axis, the body of each of the studs passing through one of the openings. Some of the studs, have bodies that pass with a first positive clearance and a second virtually zero clearance through the first openings, the first (Continued)

and second clearances being configured so that the device has different displacement amplitudes.

11 Claims, 6 Drawing Sheets

(56) References Cited

U.S. PATENT DOCUMENTS

| | | | |
|---|---|---|---|
| 5,733,050 A | 3/1998 | Diepolder et al. | |
| 8,573,922 B2 * | 11/2013 | Milfs | F16C 27/045 |
| | | | 384/624 |
| 9,783,312 B2 * | 10/2017 | Kumar | B64D 27/40 |
| 10,823,012 B2 * | 11/2020 | Hendrickson | F01D 5/02 |
| 11,174,795 B2 * | 11/2021 | Lutjen | F01D 11/005 |
| 11,215,077 B1 * | 1/2022 | Davis | F02C 7/06 |
| 11,512,609 B1 * | 11/2022 | Spathias | F02C 6/12 |
| 2016/0177765 A1 | 6/2016 | Lemoine et al. | |
| 2017/0114831 A1 * | 4/2017 | Snow | F16C 27/045 |
| 2020/0408109 A1 | 12/2020 | Hallouin et al. | |
| 2022/0099000 A1 * | 3/2022 | Becoulet | F01D 25/164 |

FOREIGN PATENT DOCUMENTS

| | | |
|---|---|---|
| FR | 3009843 A1 | 2/2015 |
| FR | 3078370 A1 | 8/2019 |
| FR | 3091902 A1 | 7/2020 |
| GB | 2310258 A | 8/1997 |

* cited by examiner

[Fig.1]
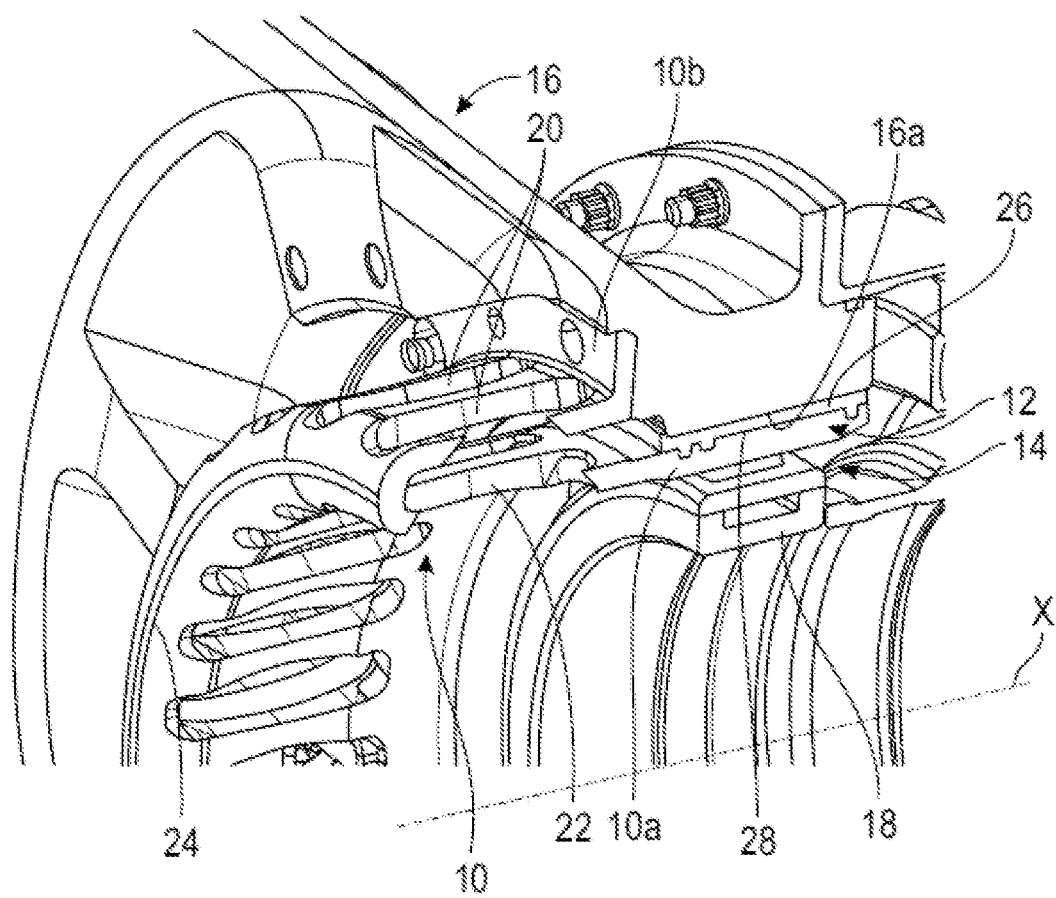

[Fig.2]
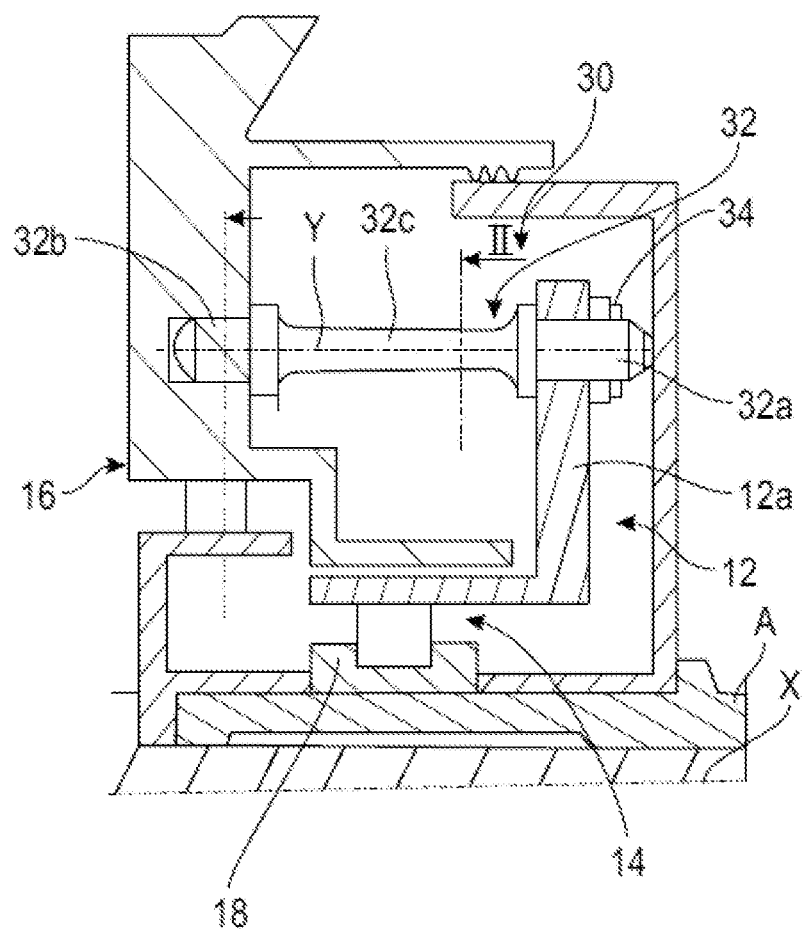

[Fig.3]
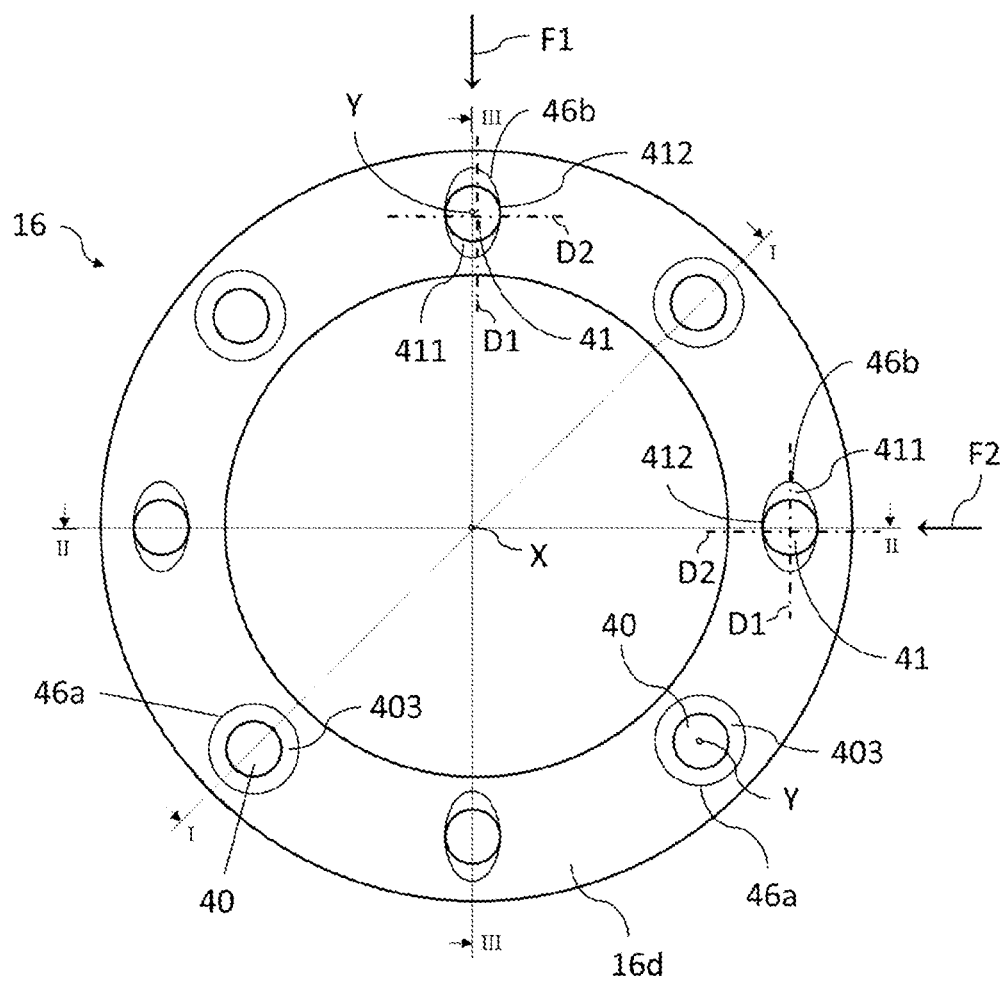

[Fig.4]
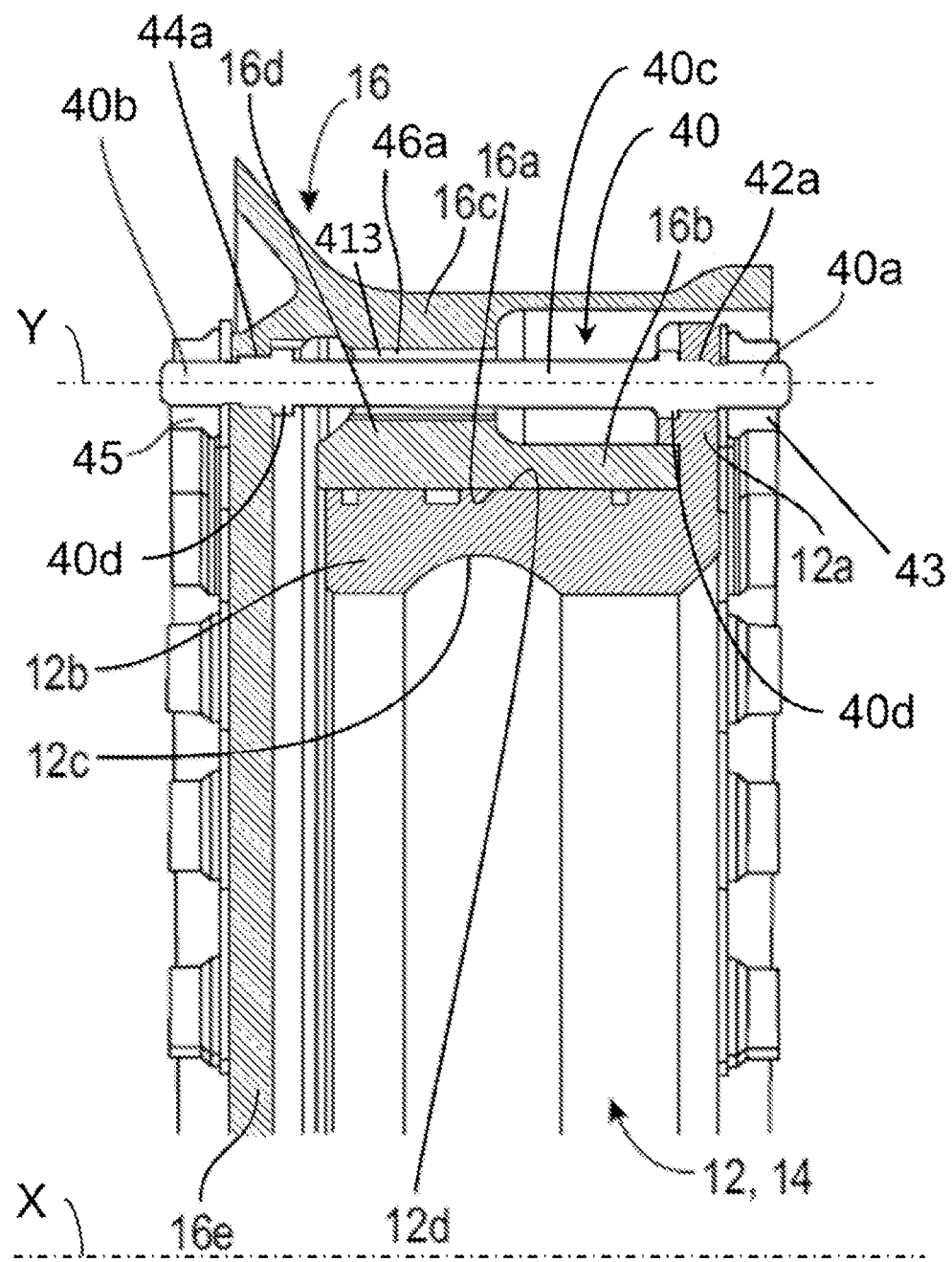

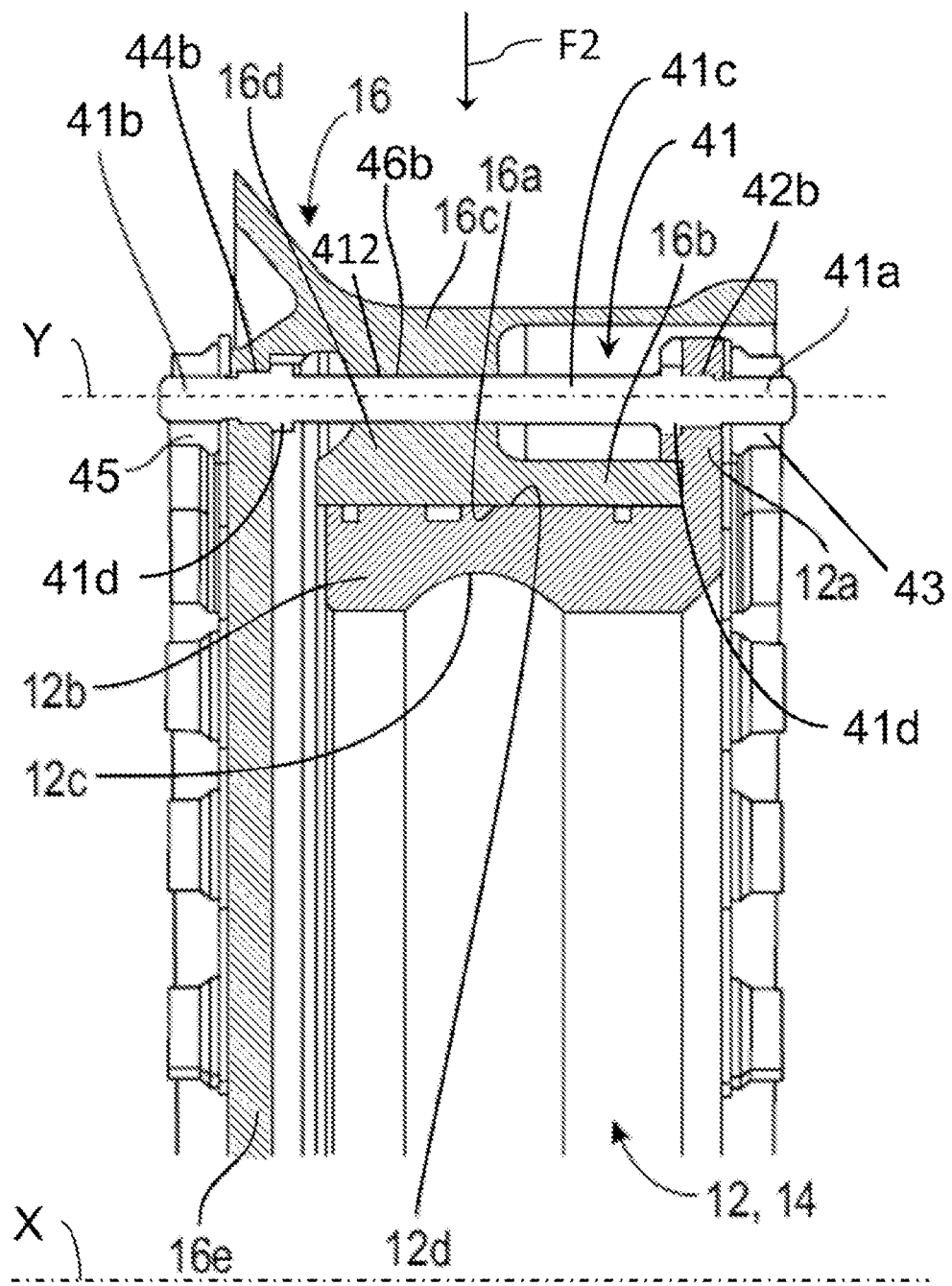
[Fig.5]

[Fig.6]
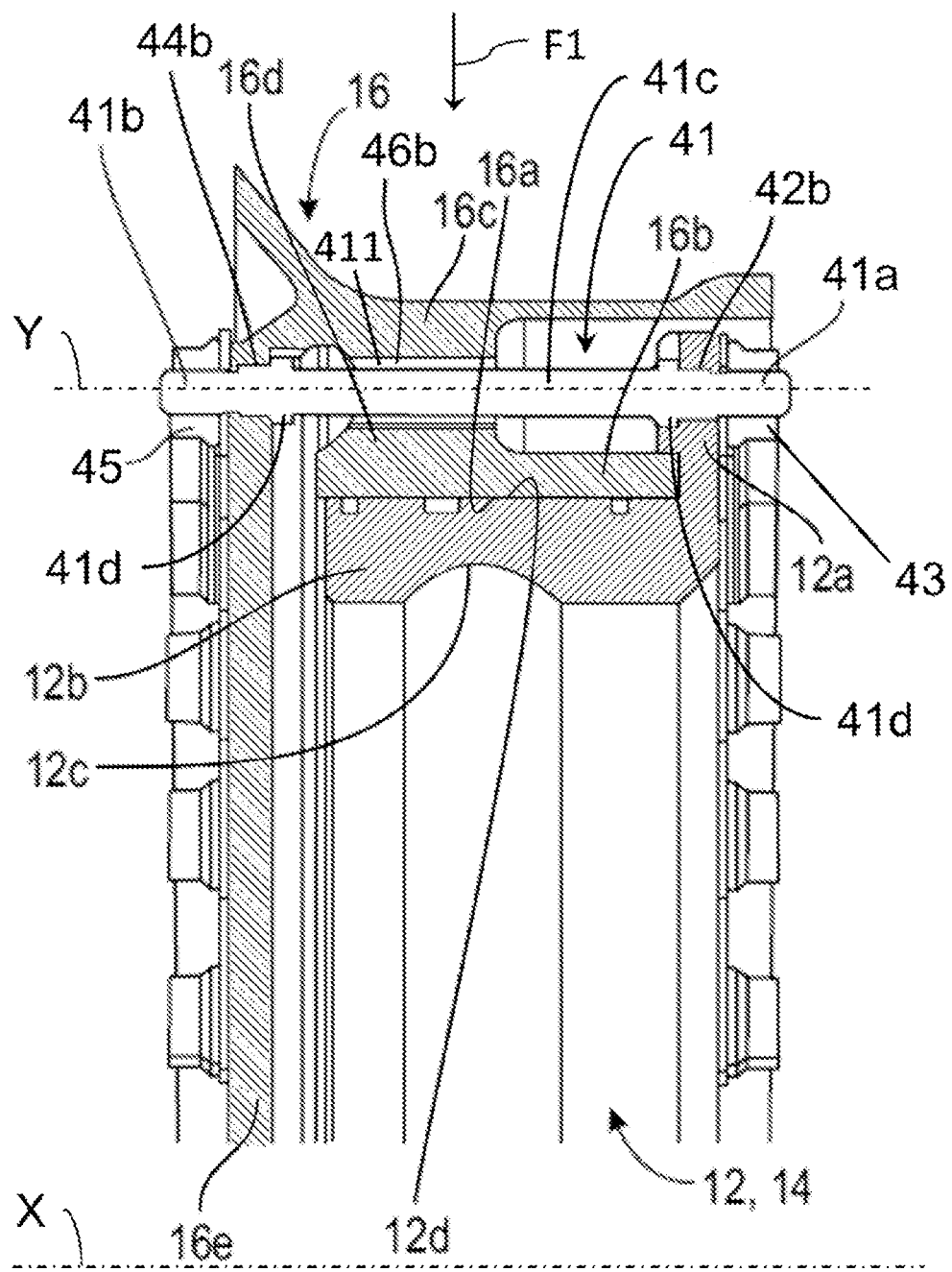

DEVICE FOR CENTERING AND GUIDING A SHAFT OF AN AIRCRAFT TURBINE ENGINE

TECHNICAL FIELD OF THE INVENTION

This invention relates to a device for centring and guiding an aircraft turbine engine shaft.

TECHNICAL BACKGROUND

An aircraft turbine engine comprises shafts, such as a low-pressure shaft and a high-pressure shaft, which are centred and guided in rotation by bearings, generally rolling bearing, for example roller or ball bearings.

A rolling bearing comprises outer and inner rings between which the rollers or the balls are arranged. The inner ring is secured to the shaft to be guided and the outer ring is attached to a bearing support which is a rigid part of the turbine engine stator.

A turbine engine shaft can reach a very high speeds, typically between 2,000 and 30,000 rpm. Such speeds induce excitations of the eigen-modes of the shafts, which can have harmful effects on the engine if the mode responds strongly.

In order to control the position of the mode, the bearings are usually combined with flexible cages that allow the boundary conditions of the shaft to be relaxed and lower the frequency of the eigen-mode. This may allow the mode to be lowered below the operating range.

In this application, "flexible cage" means a member or an assembly that provides a flexible connection between the outer ring of a bearing and its support. The flexibility of this cage is generally ensured by a capacity for elastic deformation of this cage, for example in torsion and/or bending. To provide this capability, the cage comprises at least one series of studs distributed around the axis of the bearing and extending substantially parallel to this axis.

There are currently two flexible cage technologies for bearings.

The first technology described in the documents FR-A1-3 009 843 and FR-A1-3 078 370 is a monobloc flexible cage. A cage of this type generally comprises an inner cylindrical wall to which the outer ring of the bearing is attached or integrated, and an outer cylindrical wall or an attachment flange for attaching to the bearing support. The walls are connected by a series of generally C-shaped studs or two series of studs extending around each other and connected together. The studs and the walls are then formed from a single piece.

A second technology described in the document FR-A1-3 009 843 concerns a cage obtained by assembling independent studs with the support and the ring. Each stud comprises an elongated body and connected at a first longitudinal attachment end for attaching to the support and at a second longitudinal attachment end for attaching to the ring.

In the current technique, the body has a circular cross-sectional shape, i.e. an axisymmetric shape (the cross-sectional shape of the body of the stud is symmetrical in relation to the longitudinal axis of this body). The flexible cage equipped with these studs also has an axisymmetric shape and its stiffness is identical whatever the transverse direction of the load forces of the cage.

The prior art also comprises technologies described by FR-A1-3 091 902, FR-A1-2 519 101, GB-A-2 3100 258, US-A1-2016/177765, U.S. Pat. No. 3,357,757 or CN-B-103 244 276.

The invention proposes an improvement to this second technology, which in particular allows to adapt the stiffness of the flexible cage as a function of the direction of load.

SUMMARY OF THE INVENTION

The invention proposes a device for centring and guiding an aircraft turbine engine shaft, this device comprising:
an outer ring of a rolling bearing, the ring extending around a main axis and comprising orifices arranged around this axis and oriented parallel to this axis,
an annular bearing support extending around the main axis and at least partly around the ring, this support comprising orifices and openings arranged around this axis and oriented parallel to this axis, and
a series of studs for connecting the ring to the support, these studs being distributed around the main axis and having axes of elongation substantially parallel to the main axis, each of these studs comprising a body comprising a first longitudinal end engaged in one of the orifices of the ring and a second longitudinal end engaged in one of the orifices of the support, the body of each of the studs passing through one of the openings in the support,
characterised in that some of the studs, referred to as first studs, have their bodies passing through first openings with a first positive clearance and a second clearance of almost zero, said first clearance being oriented in at least a first radial direction with respect to said axis of elongation, and said second clearance being oriented in at least a second radial direction with respect to said axis of elongation, different from the first direction, said first and second clearances being configured so that the device has different amplitudes of displacement in at least two directions perpendicular to said main axis.

Regardless of the position of the studs around their respective axes, a device using the prior art equipped with studs with axisymmetric bodies has the same stiffness in all transverse directions (perpendicular to the axis). This means that the stiffness of the device in a first direction perpendicular to the axis (for example in a horizontal plane) is identical to the stiffness of the device in a second direction perpendicular to the axis (for example in a vertical plane).

In contrast, the invention allows the device to be given different stiffnesses depending on the transverse directions of load. The different radial orientations of the clearances between the studs and the openings of the support mean that some studs respond differently to the loads than other studs. Advantageously, the device comprises two different stiffnesses in transverse directions. To stabilise a shaft, it is particularly useful to provide different stiffnesses in two transverse directions that are perpendicular to each other, as this allows to reduce the speed at which instabilities appear in the shaft guided by the device. Thanks to the formation of the flexible cage by assembling studs, the invention is advantageous because it allows a multitude of possible configurations while limiting the cost of the device. In the case of a monobloc flexible cage, for example, a change of characteristic would require the production of a new part. In the development phase, this would mean additional costs and delays, especially in the event of an error in the dimensioning of the prototype part. The time required to produce a new part would be incompressible.

It is also understood that the invention covers all combinations of shapes for the cross-sections of the studs and openings of the support. These shapes can be chosen from a general cylindrical, oblong, elliptical, rectangular or trapezoidal shape.

The device according to the invention may comprise one or more of the characteristics below, taken alone with each other or in combination with each other:
- the first and second directions are perpendicular to each other;
- the first direction and the second direction are oriented tangentially or normally to a circumference centred on the main axis;
- other studs, referred to as second studs, have their bodies passing through second openings with a third clearance oriented in the second direction, said third clearance being different from, preferably substantially greater than, the first and second clearances of the first studs in the first openings;
- the first studs alternate with the second studs around the axis;
- the bodies of the studs are generally cylindrical;
- the first openings are oblong or elliptical in cross-section and the second openings are circular in cross-section;
- the first openings are oriented so that they have an elongated shape in the same direction;
- the openings are provided in an annular wall of the support;
- the outer ring comprises an outer cylindrical surface defining with an inner cylindrical surface of the support an annular space for forming a damping oil film.

The invention also relates to an aircraft turbine engine, comprising at least one device as described above.

BRIEF DESCRIPTION OF THE FIGURES

Further characteristics and advantages of the invention will become apparent from the following detailed description, for the understanding of which reference is made to the attached drawings in which:

FIG. 1 is a schematic axial cross-section and perspective view of a device for guiding and centring an aircraft turbine engine bearing, according to prior technology;

FIG. 2 is a schematic view in axial cross-section of another device for guiding and centring an aircraft turbine engine bearing, according to the prior art;

FIG. 3 is a very schematic cross-sectional view of a support for a guiding and centring device for an aircraft turbine engine bearing according to one embodiment of the invention;

FIG. 4 is a schematic axial sectional view of the device in FIG. 3 along the section axis I-I;

FIG. 5 is a schematic axial sectional view of the device in FIG. 3 along the section axis II-II; and FIG. 6 is a schematic axial sectional view of the device in FIG. 3 along the section axis III-Ill.

DETAILED DESCRIPTION OF THE INVENTION

Reference is first made to FIG. 1, which shows a first monobloc flexible cage technology 10 according to the prior art.

The flexible cage 10 ensures the connection of an outer ring 12 of a rolling bearing 14 to an annular support 16 of this bearing 14.

In addition to the outer ring 12, the bearing 14 comprises an inner ring 18 which is secured to a shaft of the turbine engine, which is not shown. The rings 12, 18 define a roller raceway in the example shown.

The outer ring 12 is integrated into an inner cylindrical wall 10a of the cage 10, which comprises a radially outer annular flange 10b for attaching to the support 16 by screw-nut type means (not shown).

The cage 10 comprises two series of studs 20, 22, radially inner and outer respectively in relation to the axis X of the bearing 14 and of the shaft it guides.

The studs 20, 22 are distributed around the axis X and extend parallel to this axis. The studs 20 extend around the studs 22 and have a first of their longitudinal ends which is connected to the flange 10b, and a second of their longitudinal ends which is connected to the other studs 22 by an annular segment 24 with a C-shaped cross-section of the cage 10. The studs 22 extend from the wall 10a, in the extension with it, to this segment 24.

The support 16 forms part of a stator of the turbine engine and here has a substantially frustoconical general shape. At its inner periphery, it comprises an inner cylindrical surface 16a for shrink-fitting an annulus 26 which extends around the wall 10a of the cage and which defines with the latter an annular space 28 supplied with oil in order to form an oil film for damping the vibrations transmitted by the bearing 14 during operation.

FIG. 2 shows a second flexible cage technology 30 with independent studs 32, according to the prior art.

The flexible cage 30 also ensures the connection of an outer ring 12 of a rolling bearing 14 to an annular support 16 of this bearing 14.

In addition to the outer ring 12, the bearing 14 comprises an inner ring 18 which is secured to a shaft A of the turbine engine. The rings 12, 18 define a roller raceway in the example shown.

The outer ring 12 comprises a radially outer annular flange 12a which comprises orifices through which the ends 32a of the studs 32 pass. These ends 32a are threaded and receive nuts 34 tightened against the flange 12a.

The opposite ends 32b of the studs 32 are attached in holes in the support 16.

The cage 30 comprises a series of studs 32 which are distributed around the axis X and extend parallel to this axis. The studs 32 each comprise a body 32c which is circular in cross-section, and are therefore symmetrical with respect to their axis Y. The studs 32 are also symmetrical to each other about the axis X.

The flexible cage 30 is therefore "axisymmetric", and the stiffness of the cage 10 and of the bearing 14 is therefore the same in all transverse directions (perpendicular to the axis X).

However, from a dynamic point of view, it can be interesting to have different stiffnesses in two orthogonal directions: this provides a stabilising effect to the device by delaying the speed of appearance of instabilities due to the inner damping of the shaft. In fact, by creating different flexibilities in at least two directions, at least two modes appear, as opposed to a single mode in the axisymmetric case.

In the case where the initial radial stiffness of the axisymmetric cage K is such that $K1<K<K2$ where K1 and K2 are the stiffnesses of the asymmetric flexible cage respectively in the different directions 1 and 2 transverse to the axis X, then the frequencies of the modes created will be within the frequency of the initial single mode.

In this case, the frequency with which instabilities can occur is increased, thereby allowing to limit the risk of potentially damaging instability for the engine.

The control of the movement of the shaft in azimuth can also be used to improve the performance of the engine. Under mechanical or thermal loading, the engine enclosure deforms, and these distortions generate different clearance openings and closures depending on the azimuth. This implies a degradation in the engine performance which could be limited if the dynamic displacement is optimised to compensate for some of the distortion, for example by stiffening the flexible cage in the direction of clearance closure and softening it in the direction of the clearance opening.

FIGS. 3 to 6 illustrate an embodiment of a device, according to the invention, for centring and guiding an aircraft turbine engine shaft, which allows to meet this need. The device comprises:
- an outer ring 12 of a rolling bearing 14, said ring extending around a main axis X and comprising orifices 42a, 42b arranged around this axis X and oriented parallel to this axis X,
- an annular bearing support 16 extending around the main axis X and at least partly around the ring 12, this support 16 comprising orifices 44a, 44b and openings 46a, 46b arranged around this axis X and oriented parallel to this axis X, and
- a series of studs 40, 41 for connecting the ring 12 to the support 16.

The studs 40, 41 are distributed around the main axis X and have axes of elongation Y substantially parallel to the main axis X. Advantageously, each of these studs 40, 41 comprises a body 40c, 41c, of generally cylindrical shape, comprising a first longitudinal end 40a, 41a and a second longitudinal end 40b, 41b. In another embodiment, not shown, the bodies 40c, 41c of the studs 40, 41 may have a generally non-cylindrical shape, for example oblong. Each of the first ends 40a, 41a is in one of the orifices 42a, 42b of the ring 12 and each of the second ends 40b, 41b is engaged in one of the orifices 44a, 44b of the support 16. In particular, the first and second ends 40a, 41a, 40b, 41b can be engaged without clearances in the aforementioned orifices. The body 40c, 41c of each of the studs 40, 41 passes through one of the openings 46a, 46b in the support 16. These openings 46a, 46b may be provided in a substantially radial annular wall 16d of the support 16. It is understood that the openings 46a, 46b are axially aligned with the orifices 42a, 42b in the ring 12 and the orifices 44a, 44b in the support 16.

First studs 41 and second studs 40 can be distinguished from the studs 40, 41. First openings 46b and second openings 46a can also be distinguished from openings 46a, 46b. The first studs 41 have their bodies 41c passing through the first openings 46b in the support 16 with a first positive clearance 411 and a second clearance 412 of almost zero. The second studs 40 have their bodies 40c passing through the second openings 46a in the support 16 with a third clearance 403.

The first clearance 411 is oriented in at least a first direction D1 radial with respect to the axis of elongation Y. The second clearance 412 is oriented in at least a second direction D2 radial with respect to the axis of elongation Y, this second direction D2 being different from the first direction D1. The first and second clearances 411, 412 are configured so that the device has different amplitudes of movement in at least two distinct directions perpendicular to the main axis X. The third clearance 403 is different from the first and second clearances 411, 412 of the first studs 41 in the first openings 46b. The third clearance 403 is preferably substantially larger than the first and second clearances 411, 412 and is oriented in the second direction D2 radial with respect to the axis of elongation Y.

The first and second directions D1, D2 perpendicular to the axis X are preferably perpendicular to each other. The first direction D1 and the second direction D2 can be oriented tangentially or normally with respect to a circumference centred on the main axis X.

In the example of embodiment shown in FIG. 3, the first studs 41 alternate with the second studs 40 around the main axis X. It is understood that at least one first stud 41 can be comprised between two second studs 40 around the axis X and that at least one second stud 40 can be comprised between two first studs 41 around the axis X. In other words, the number of first studs 41 between two second studs 40 can be different from one. The number of second studs 40 between two first studs 41 can also be different from one.

Advantageously, the first ends 40a, 41a of the studs 40, 41 are generally circular in cross-section. The second ends 40b, 41b also advantageously have a generally circular cross-section. In another embodiment, not shown, the first ends 40a, 41a and the second ends 40b, 41b may have a generally non-circular cross-sectional shape, for example oblong.

The ring 12 is generally L-shaped in axial cross-section and comprises a cylindrical portion 12b, one axial end of which is connected to a radially outer annular flange 12a for attaching the studs 40, 41.

The cylindrical portion 12b of the ring 12 comprises at its inner periphery an annular gorge 12c for rolling the balls of the bearing 14 and at its outer periphery an outer cylindrical surface 12d defining with the support 16 an annular space for forming a damping oil film.

The support 16 is partially shown in the drawings.

The support 16 comprises a first cylindrical wall 16b extending around the cylindrical portion 12b of the ring 12 and comprising an inner cylindrical surface 16a defining with the surface 12d the aforementioned damping oil film forming space. The support 16 comprises a second cylindrical wall 16c extending around the first cylindrical wall 16b, or even around the flange 12a of the ring 12. The first and second cylindrical walls 16b, 16c are joined together by the substantially radial annular wall 16d comprising the openings 46a, 46b through which pass the bodies 40c, 41c of the studs 40, 41. In the example shown, it can be seen that the studs 40, 41 pass through an annular space formed between the walls 16b, 16c. The wall 16d is located at one axial end of this space. The support 16 also comprises an annular flange 16e.

Advantageously, the openings 46a, 46b comprise the first openings 46b which are generally oblong or elliptical in cross-section and second openings 46a which are generally circular in cross-section. The first openings 46b can be elongated, preferably in the same direction. In another embodiment, not shown, the first openings 46b may be generally circular in cross-section and the second openings 46a may be generally non-circular in cross-section, for example oblong or elliptical. In this way, when the body 40c, 41c of non-cylindrical shape, for example oblong, of a stud 40, 41 is engaged in one of the first openings 46b, of circular cross-section, the stud 40, 41 can have a first positive clearance and a second clearance of almost zero as described above. Similarly, when the non-cylindrical, for example oblong, body 40c, 41c of a stud 40, 41 is engaged in one of the second openings 46a, of non-circular, for example oblong, cross-section, the stud 40, 41 may have a third clearance substantially greater than the first and second clearances.

The bodies 40c of the second studs 40 can pass through the second openings 46a in the annular wall 16d of the support 16 with a third clearance 403, as shown in FIG. 4, which shows an axial sectional view of the device along the cutting axis I-I shown in FIG. 3. This third clearance 403 is oriented in all radial directions with respect to the axis Y. It is understood that the openings 46a have a diameter greater than the diameter of the body 40c of the second studs 40.

The bodies 41c of the first studs 41 can pass through the first openings 46b in the annular wall 16d of the support 16 with a first positive clearance 411 and a second clearance 412 of almost zero, as shown in FIGS. 5 and 6, which respectively show an axial sectional view of the device along the sectional axis II-II and the sectional axis III-Ill drawn in FIG. 3. The first positive clearance 411, visible in FIG. 6, is oriented in a first direction D1 radial with respect to the axis Y, this first direction D1 itself being oriented tangentially or normally with respect to a circumference centred on the axis X. The second clearance 412 of almost zero, visible in FIG. 5, is oriented in a second radial direction D2 with respect to the axis of elongation Y, this second direction D2 itself being oriented tangentially or in a normal manner with respect to a circumference centred on the axis X and being different from the first direction D1. It is understood that the elongated shape of the first openings 46b means that they have a first longitudinal dimension greater than a second dimension, substantially perpendicular to the first dimension. It is also understood that the first longitudinal dimension is greater than the diameter of the body 41c of the studs 41, and that the second dimension is substantially equal to the diameter of the body 41c. In other words, the first studs 41 can move with a certain amplitude only in a longitudinal direction, corresponding to the first direction D1 and oriented tangentially or normally with respect to a circumference centred on the axis X.

The orifices 42a, 42b in the ring 12 and the orifices 44a, 44b in the support 16 are generally circular in cross-section. In this way, the ends 40a, 40b of the studs 40, 41 can be engaged without clearance in the ring 12 and in the support 16, as shown in FIGS. 4 to 6.

The orifices 42a, 42b can be provided in the flange 12a. The orifices 42a are passed through by the ends 40a of the studs 40 and the orifices 42b are passed through by the ends 41a of the studs 41; these ends 40a, 41a can be threaded and receive nuts 43 tightened against the flange 12a.

The orifices 44a, 44b can be provided in the flange 16e. The orifices 44a are passed through by the ends 40b of the studs 40 and the orifices 44b are passed through by the ends 41b of the studs 41; these ends 40b, 41b can be threaded and receive nuts 45 tightened against the flange 16e.

The body 40c, 41c of each stud 40, 41 can be connected to each of the ends 40a, 40b, 41a, 41b by annular collars 40d, 41d. The collars 40d, 41d may comprise a flattened area which can be supported on the flanges 16e, 12a of the support 16 and of the ring 12 respectively, so that rotation of the studs 40, 41 about their longitudinal axis can be prevented.

In the example shown in FIG. 3, the cage allows non-axisymmetric amplitudes of displacement of the studs 40, 41. The amplitude of displacement allowed by the cage under a first transverse load (arrow F1) is greater than that allowed by the cage under a second load (arrow F2) perpendicular to this first load. As a result, the stiffness of the cage will be lower with the first load than with the second. When the cage is subjected to the first load (arrow F1), all the studs 40, 41 can deform in the direction of the first load (arrow F1) in the clearance between the openings 46a, 46b without the bodies 40c, 41c coming into abutment against the inner walls of the openings 46a, 46b.

When the cage is loaded with the second load (arrow F2) perpendicular to the first load (arrow F1), the deformation effect allowed by the clearances 403, oriented in all radial directions, of the second openings 46a is reduced by the presence of the second clearances 412 of almost zero of the first openings 46b in a direction parallel to the second load (arrow F2). In this direction, the first studs 41 cannot deform and abuts against the inner walls of the first openings 46b.

The invention also relates to an aircraft turbine engine comprising at least one device as described above.

The device and the flexible cage according to the invention are therefore advantageous in that the stiffness of the cage differs according to the angular position of the force transmitted to the cage in a direction transverse to its main axis.

The invention claimed is:

1. A device for centering and guiding an aircraft turbine engine shaft, this device comprising:
   an outer ring of a rolling bearing, this ring extending about a main axis and comprising orifices arranged about this axis and oriented parallel to this axis,
   an annular bearing support extending around the main axis and at least partly around the ring, this support comprising orifices and openings arranged around this axis and oriented parallel to this axis, and
   a series of studs for connecting the ring to the support, these studs being distributed around the main axis and having axes of elongation substantially parallel to the main axis, each of these studs comprising a body comprising a first longitudinal end engaged in one of the orifices of the ring and a second longitudinal end engaged in one of the orifices of the support, the body of each of said studs passing through one of the openings of the support,
   wherein some of said studs, referred to as first studs, have their bodies passing through first openings with a first positive clearance and a second clearance of almost zero, said first clearance being oriented in at least a first direction radial with respect to said axis of elongation, and said second clearance being oriented in at least one second direction radial with respect to said axis of elongation, different from the first direction, said first and second clearances being configured so that the device has different amplitudes of displacement in at least two directions perpendicular to said main axis.

2. The device according to claim 1, wherein said first and second directions are perpendicular to each other.

3. The device according to claim 1, wherein said first direction and said second direction are oriented tangentially or normally with respect to a circumference centred on said main axis.

4. The device according to claim 1, wherein other studs, referred to as second studs, have their bodies passing through second openings with a third clearance oriented in the second direction, said third clearance being different from, preferably substantially greater than, the first and second clearances of the first studs in the first openings.

5. The device according to claim 4, wherein said first studs alternate with said second studs around said axis.

6. The device according to claim 4, wherein the first openings are oblong or elliptical in cross-section and the second openings are circular in cross-section.

7. The device according to the preceding claim 6, wherein said first openings are oriented so that they have an elongated shape in the same direction.

8. The device according to claim 1, wherein said bodies are generally cylindrical in cross-section.

9. The device according to claim 1, wherein the openings are provided in an annular wall of the support.

10. The device according to claim 1, wherein the outer ring comprises an outer cylindrical surface defining with an inner cylindrical surface of the support an annular space for forming a damping oil film.

11. An aircraft turbine engine, comprising at least one device according to claim 1.

* * * * *